United States Patent
Gill et al.

(10) Patent No.: US 7,554,759 B2
(45) Date of Patent: Jun. 30, 2009

(54) MECHANISM FOR ISOLATING MARGINAL RECORDING TO MEDIA OR RECORDING APPARATUS

(75) Inventors: Richard Allen Gill, Arvada, CO (US); Erich R. Oetting, Arvada, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 395 days.

(21) Appl. No.: 11/453,111

(22) Filed: Jun. 12, 2006

(65) Prior Publication Data

US 2008/0002287 A1    Jan. 3, 2008

(51) Int. Cl.
*G11B 15/18* (2006.01)

(52) U.S. Cl. .......................................... 360/69; 714/47

(58) Field of Classification Search ........................ None
See application file for complete search history.

(56) References Cited

U.S. PATENT DOCUMENTS 5,754,353 A * 5/1998 Behrens et al. ............... 360/53

7,277,246 B2 * 10/2007 Barbian et al. ................. 360/69

OTHER PUBLICATIONS

Sun/StorageTek T10000 Tape Drive, Sun Microsystems, Inc., Technical Brief, Oct. 2005.
Sun StorageTek T10000 Tape Drive, Storage Solutions, Sun Microsystems, Inc. 2006.
T10000 Tape Drive, Storage Tek, downloaded May 1, 2006, http://www.storagetek.com/products/product_page2773.html.

* cited by examiner

*Primary Examiner*—Jason C Olson
(74) *Attorney, Agent, or Firm*—Dorsey & Whitney LLP (57) ABSTRACT

In one embodiment, a method and apparatus for isolating marginal recording to media or recording apparatus is disclosed. The method includes generating an experience metric from an interaction between a media mounted in a drive, updating one or more metrics for each of the media and the drive based on the experience metric and one or more prior metrics of the media and the drive, storing the one or more updated metrics to the associated media and drive, and utilizing the one or more updated metrics to predict performance trends of the media and the drive for preventative maintenance purposes. Other embodiments are also disclosed.

14 Claims, 6 Drawing Sheets

MECHANISM FOR ISOLATING MARGINAL RECORDING TO MEDIA OR RECORDING APPARATUS

FIELD OF INVENTION

An embodiment of the invention relates to media storage systems, and more specifically, to isolating marginal recording to media or recording apparatus.

BACKGROUND OF INVENTION

In a media storage system, many media drives interact with many types of media. If an interaction results in a defective performance, then it can be difficult to determine the culprit of the problem. In some cases, a process of elimination may be employed where either the media could be mounted in another media drive or another media with a good performance record could be mounted in the media drive. A repeated failure would indicate the faulty component. However, this process of elimination may be time-consuming and unrealistic.

In current media storage systems, there may be several media drives with thousands or more media capable of being loaded into these media drives. The interaction experience between the various media drives and media can range from a great experience all the way to a non-existent experience. On the lower end of the performance spectrum, the negative experiences may involve lower throughput of data or no data at all.

A media drive is capable of performing certain actions to compensate for any problems it is experiencing in an interaction with a media. As a result, the media drive may hide many problems. However, over time, it is still likely that the media drive will exhibit symptoms of the below-average experience between the media drive and the media.

In this light, it would be beneficial to provide a system where it can be predicted if certain components, such as a media drive or a media itself, will have a problem. In this way, certain actions may be taken that could prevent the problem before it ever occurs. For instance, if a media is predicted to provide continual worsening experiences through its lifetime, then it would be prudent to replace this media before these experiences actually occur. A mechanism to help accurately predict and prevent impending media drive or media degradation and failure at customer sites would be beneficial.

SUMMARY OF INVENTION

The present invention includes novel methods and apparatus for isolating marginal recording to media or recording apparatus.

According to one embodiment of the invention, a method is disclosed. The method includes generating an experience metric from an interaction between a media mounted in a drive, updating one or more metrics for each of the media and the drive based on the experience metric and one or more prior metrics of the media and the drive, storing the one or more updated metrics to the associated media and drive, and utilizing the one or more updated metrics to predict performance trends of the media and the drive for preventative maintenance purposes.

According to another embodiment of the invention, an apparatus is disclosed. The apparatus includes a recording media, a drive to receive and interact with the recording media, and an asset management tool communicatively coupled to the recording media and the drive to analyze one or more performance trends of at least one of the recording media and the drive. In addition, the performance trends are based on one or more metrics of the recording media and the drive determined from an experience metric of an interaction between the recording media mounted in the drive and one or more prior quality and confidence metrics of the recording media and the drive.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for isolating marginal recording to media or recording apparatus. According to one embodiment, the method includes generating an experience metric from an interaction between a media mounted in a drive, updating one or more metrics for each of the media and the drive based on the experience metric and one or more prior metrics of the media and the drive, storing the one or more updated metrics to the associated media and drive, and utilizing the one or more updated metrics to predict performance trends of the media and the drive for preventative maintenance purposes.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client).

Figure 1:
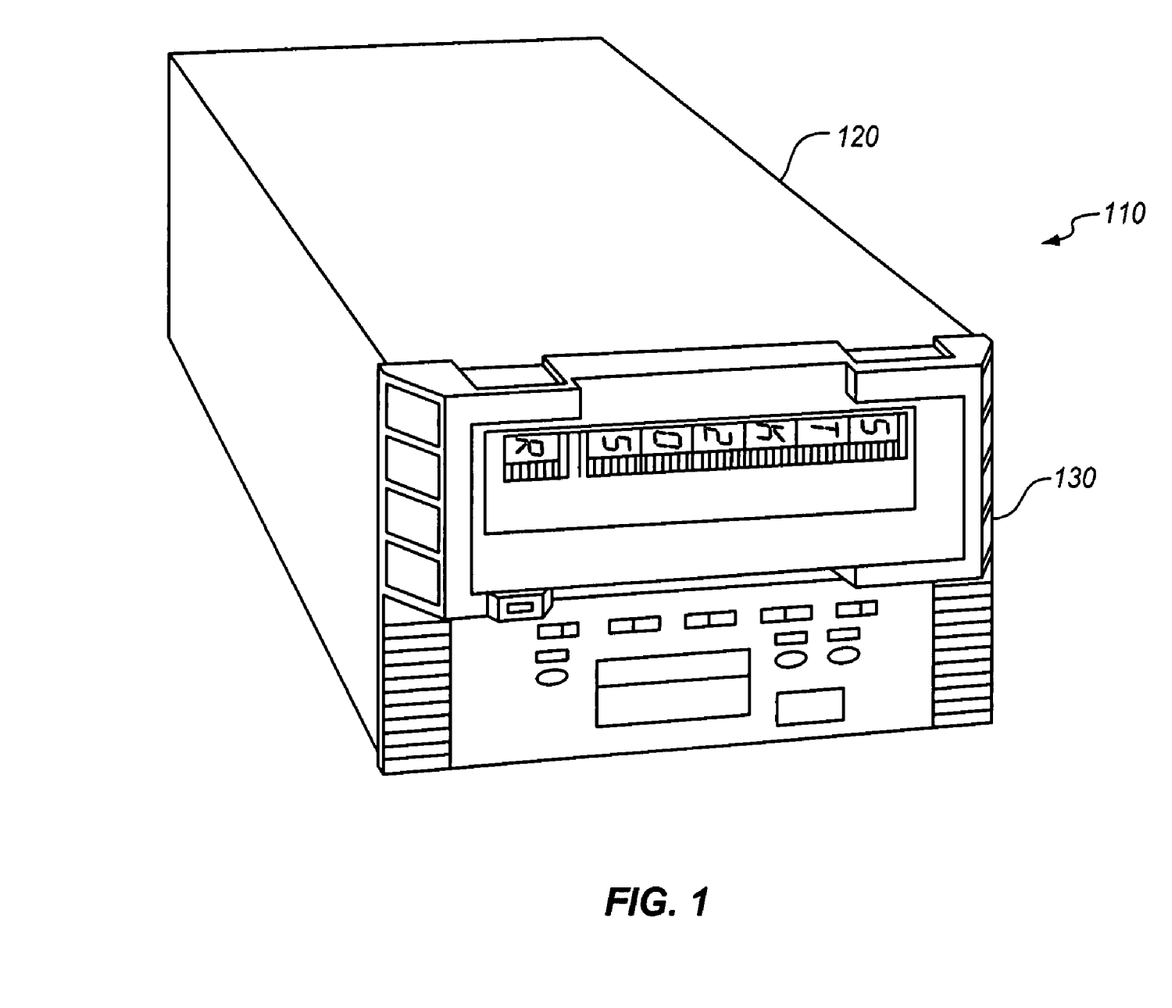
FIG. 1 is a block diagram of one embodiment of a portion of a tape storage system.

Embodiments of the invention introduce a novel method for isolating marginal recording to media or recording apparatus. FIG. 1 is a block diagram of a tape drive and tape capable of carrying out embodiments of the invention. With reference to FIG. 1, a tape drive is generally indicated at 110. Tape drive 110 includes a housing 120. Housing 120 is for receiving a magnetic tape cartridge 130. In some embodiments, a tape storage library may include single or multiple tape drives and tapes, similar to those illustrated here. In other embodiments, a tape storage library may include only tapes. One skilled in the art will appreciate that there are a variety of implementations for a tape storage library.

This tape drive and tape are portions of one embodiment of an exemplary media storage system utilizing embodiments of the invention. Throughout the following description, reference will be made to tape drives and tapes for exemplary purposes. However, these references to tape drives and tapes are not intended to limit embodiments of the invention. For instance, it is envisioned that different types of media and media readers may be utilized in embodiments of the invention, such as magnetic disk, optical disk, holographic disk, and the like.

Figure 2:
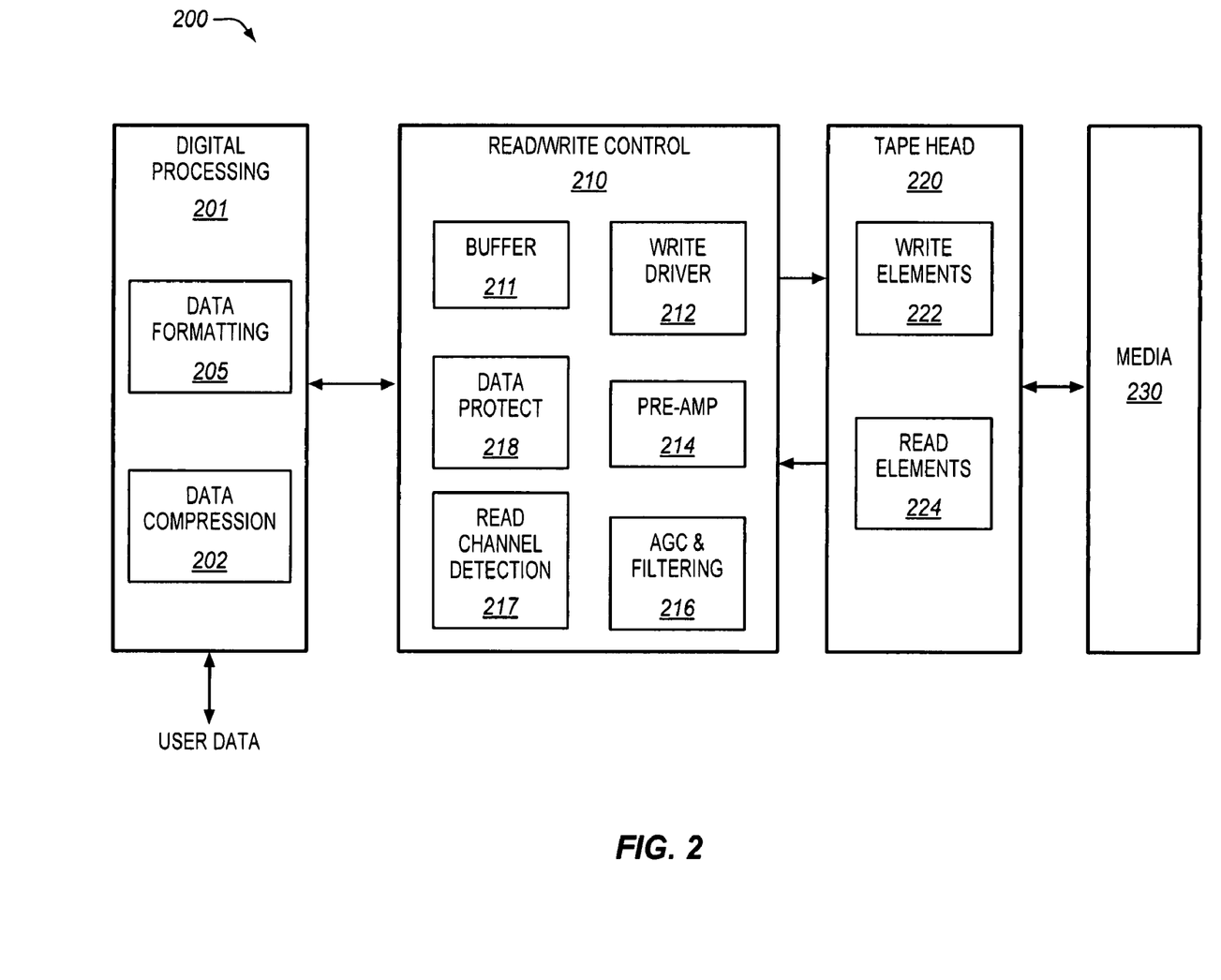
FIG. 2 is a block diagram of one embodiment of an exemplary tape drive carrying out embodiments of the invention.

FIG. 2 is a block diagram illustrating one embodiment of an exemplary tape drive for use in various embodiments of the invention. In one embodiment, tape drive 200 is the same as tape drive 120 described with respect to FIG. 1. Tape drive 200 includes a digital processing unit 201, read/write control 210, tape head 220, and media 230.

Digital processing unit 201 may receive user write data from an I/O controller (not shown) that is forwarded for storage, and may transmit received read data that is forwarded to the I/O controller, for instance. Particularly, digital processing unit 201 includes a data compression unit 202 and data formatting unit 205. Data compression unit 202 compresses write data to be stored at tape drive 200, and decompresses read data to be forwarded to a user. Data formatting unit conditions write data that is to be stored at tape drive 200.

Media 230 is a physical tape medium on which data is stored. In one embodiment, media 230 is a magnetic tape. Tape head 220 is an electromagnetic component which reads and writes onto media 230 as media 230 passes over it. Tape head 220 includes write elements 222 and read elements 224 to perform the write and read operations.

Read/write control 210 controls the reading and writing of data at tape drive 200. Read/write control 210 includes a write driver 212, a pre-amplifier 214, automatic gain and control (AGC) and filtering unit 216, read channel detection 217 and data protect 218. Write driver 212 is implemented to control the writing of user data to media 230.

Pre-amplifier 224 provides low noise amplification of a read signal received from read elements 224. AGC and filtering unit 216 includes an AGC component that is implemented to adjust for variations in signal amplitude and to keep a fixed input signal to read channel detection. A filtering component of unit 216 is used to shape waveforms for better detection and forwards to a read channel detection 217.

Data protect 218 uses ECC to protect user data. In one embodiment, data protect 218 performs Reed Solomon (RS) encoding by adding bytes of data to user bytes to enable recovery of user data bytes when some bytes are missing due to defects or damage to media 230. Data protect 218 also provides data interleave and rotation which distributes user data and RS bytes over a larger piece of media 230. According to a further embodiment, data protect 218 writes to media 230 sixteen channels at a time to allow data to be distributed across the width of media 230.

According to one embodiment, data protect 218 implements a recording format that provides a guaranteed fixed capacity. In order to provide this capacity, media 230 provides more recordable media than the fixed capacity requires. The extra recording space is used for write defect skipping. In this way, a system can guarantee, within some probability of defective media events, that the media will hold the advertised capacity.

Figure 3:
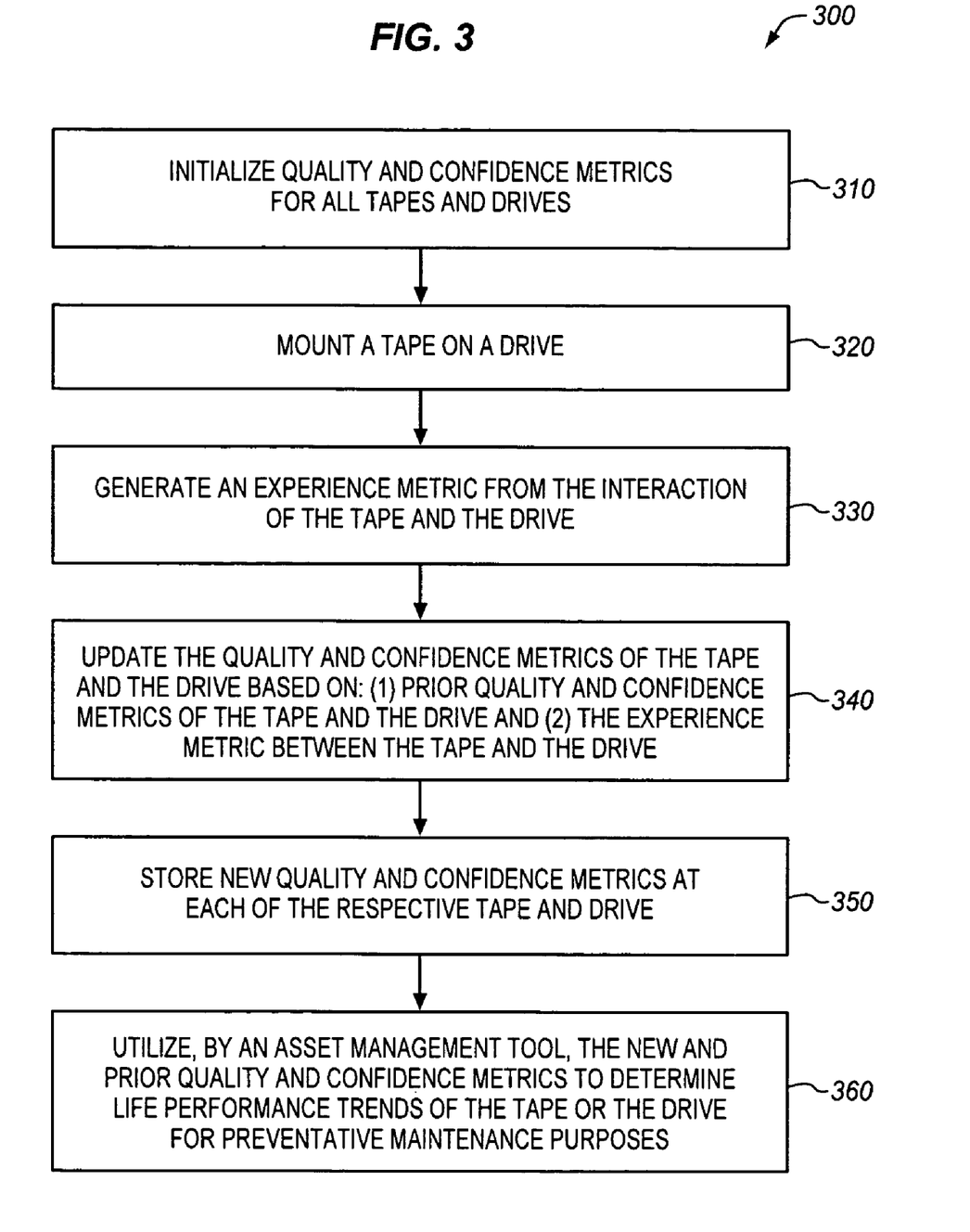
FIG. 3 is a flow diagram illustrating a method according to one embodiment of the invention.

FIG. 3 is a flow diagram illustrating a method according to one embodiment of the invention. In one embodiment, process 300 is an algorithm that isolates marginal recording to media or recording apparatus. In one embodiment, process 300 occurs in a media storage system, such as one including the media storage system 100 described with respect to FIG. 1. The following description refers to tapes and tape drives for exemplary purposes. However, embodiments of the invention are not limited to this particular media type and may be applicable to a wide range of other media types.

Process 300 begins at processing block 310, where quality and confidence metrics for all tapes and tape drives in a tape storage system are initialized. In one embodiment, the metrics are all normalized to values between 0 and 1. In some embodiments, these tapes and drives may be known as "objects". In one embodiment, the quality metric includes a predicted quality factor of the tape and the drive given the experience and a history of the tape and the drive. The confidence metric of the tape describes the credibility of its quality factor based on the quality and quantity of the drives the tape has previously interacted with. The confidence metric of the drive describes the credibility of its quality factor based on the quality and quantity of the tapes the drive has previously interacted with.

At processing block 320, a tape is mounted in a drive. Then, at processing block 330, an experience metric for the operations and interactions occurring between the tape and drive is generated. In one embodiment, the experience metric generally represents a quality of the interaction between the tape and the drive.

Then, at processing block 340, the prior quality and confidence metrics of the tape and the drive are updated. This updating utilizes the current experience metric, the prior tape quality and confidence metrics, and the prior drive quality and confidences metrics. At processing block 350, the updated quality and confidence metrics for the tape and drive are stored at each of the associated tape and drive. In some embodiments, the metrics for the drive may be stored in memory, such as EEPROM, of the tape drive. Additionally, the metrics for the tape may be stored in a radio frequency identification (RFID) tag of the tape. One skilled in the art will appreciate the variety of storage possibilities for metrics at each of the objects.

Finally, at processing block 360, an asset management tool of the tape storage system utilizes the stored updated quality and confidence metrics associated with the tape and the drive to determine any trends in performance of either the tape or the drive. Accordingly, these quality and confidence metrics may be used as predictors for maintenance purposes of the future performance of objects in a media storage system.

Figure 4:
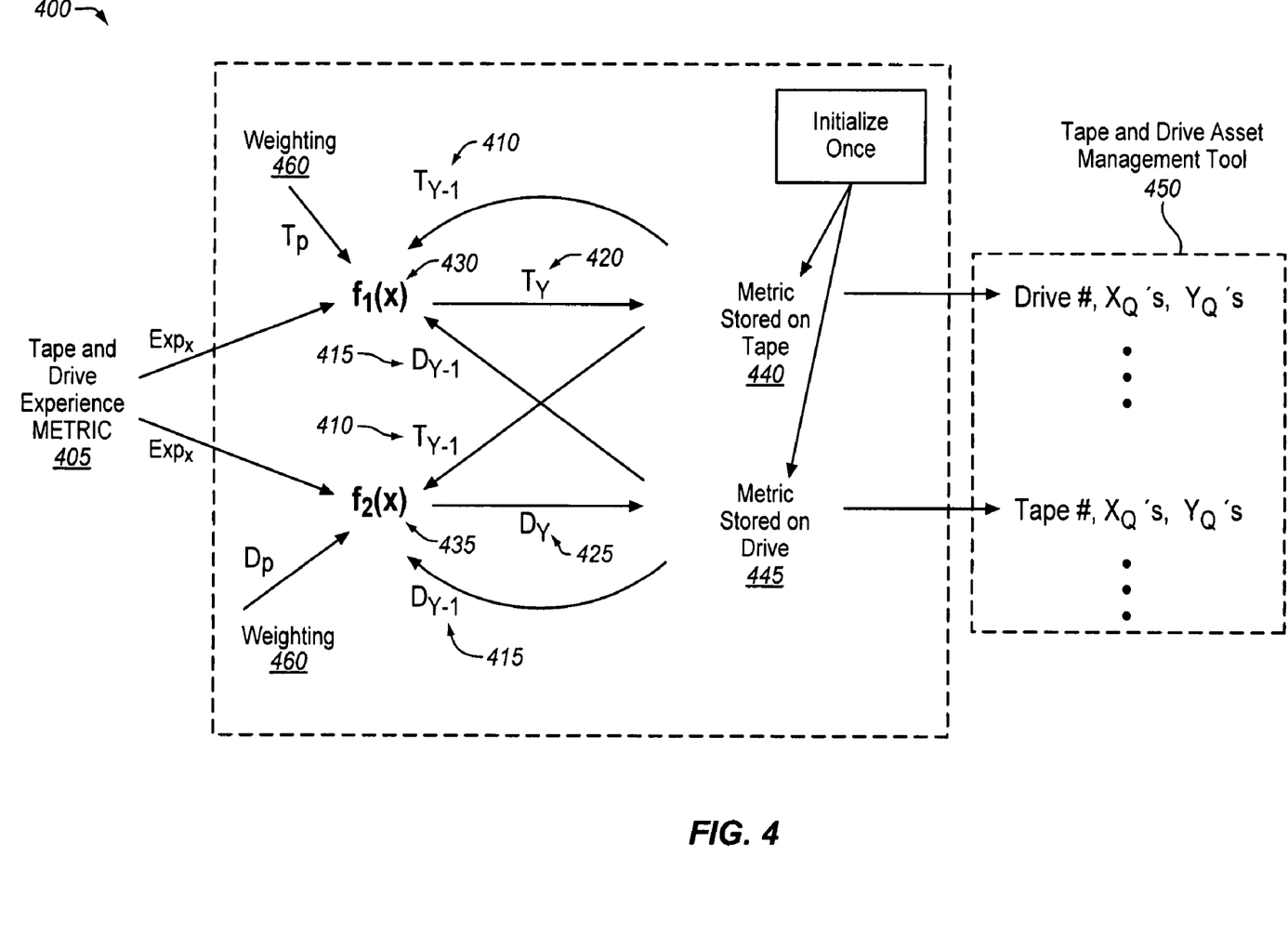
FIG. 4 is an illustration of one embodiment of an algorithm of the invention.

FIG. 4 is an illustration of one embodiment of an algorithm of the invention. In one embodiment, algorithm 400 is used in processing block 340 of FIG. 3 as a formula to update the quality and confidence metrics of the tape and the drive. The formula used at each of the tape and drive is represented by functions 430 and 435 in FIG. 4. Function $f_1(x)$ 430 represents the metric formula for the tape, while function $f_2(x)$ 435 represents the metric formula for the drive.

Each function 430, 435 receives three inputs. These inputs include the present experience 405 between the tape and the drive, a previous metric of the tape 410, and a previous metric of the drive 415. The output of the functions 430, 435 is an updated metric 420, 425 for the tape and the drive. These updated metrics 420, 425 may be stored on the tape 440 and on the drive 445. Then, a tape and drive asset management tool 450 may utilize these updated metrics 420, 425 stored at each component 440, 445 to determine performance trends of objects in a media storage system for preventative maintenance purposes.

In some embodiments, the prior metrics 410, 415 inputted into the formulas 430, 435 may be weighted by a weighting factor 460. This weighting 460 is used to attenuate or amplify terms in the formula 430, 435 to match a true quality of the tape or the drive. The weightings 460 may be based on differences in the tape and the drive reliability likelihoods.

In some embodiments, the formulas 430, 435 may follow a variety of rules. For instance, a formula 430, 435 may operate according to the following guidelines: (1) the confidence of an object indicates how much the quality should be changing; (2) the confidence increases when the experience is as strong as the stronger object; (3) confidence of an object may be based on whether or not the object is contributing to the experience; and (4) confidence also increases as the quality reaches stability. One skilled in the art will appreciate that the guidelines are not intended to be limiting to embodiments of the invention and that guidelines may be added or removed.

In some embodiments, the following assumptions may be made: (1) confidence continually changes; (2) a stronger object (high quality factor and confidence) judges the weaker object; (3) in the case of a quality factor tie, an object with higher confidence judges the object with lower confidence; and (4) in the case of a quality factor tie and confidence tie, bias goes towards the tape. It is envisioned that other assumptions may be made and embodiments of the invention are not necessarily limited to those assumptions mentioned here.

In other embodiments of the invention, different metrics may be monitored and updated by the algorithm. These metrics may include the recording efficiency during the experience, the expansion encountered during the experience, the read efficiency during the experience, write efficiency, and so on. In some embodiments, it is possible to simultaneously monitor and track more than one metric at a time for a given experience.

In some embodiments, the tape and drive asset management tool 450 may exist in the tape drive. For instance, the tape and drive asset management tool 450 may be implemented in digital processing unit 201 or read/write control unit 210 of the tape drive 200 described with respect to FIG. 2. Such an embodiment may be useful in site without external maintenance tools. Such an asset management tool implementation may alert customers through a host channel means. In other embodiments, the tape and drive asset management tool 450 may exist as an external management tool. Such an embodiment may be useful in sites with many drives or in tape storage libraries without drives. It is envisioned that, in either of these embodiments, the asset management tool 450 may be implemented as software, hardware, firmware, or some combination of these.

Figure 5:
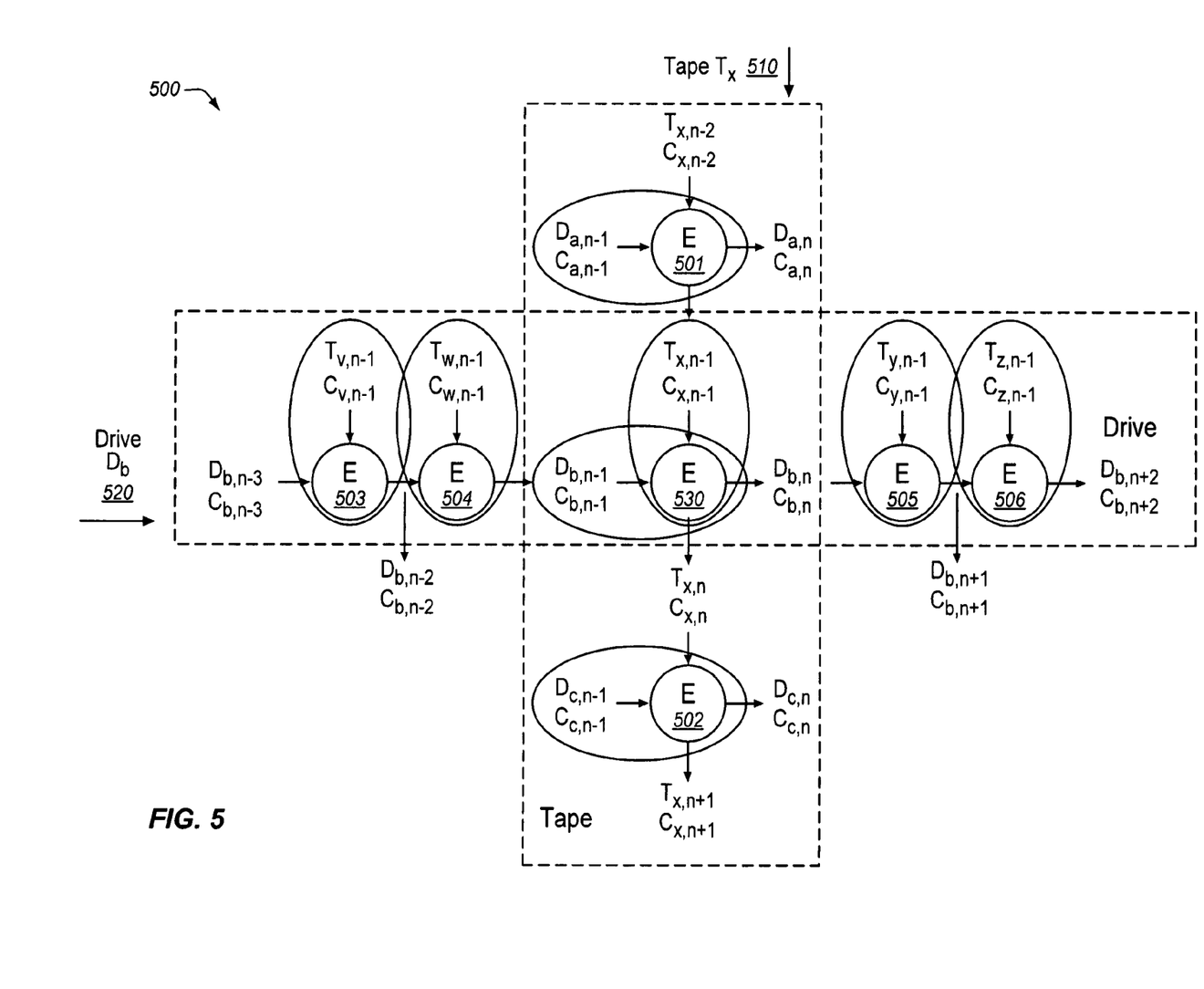
FIG. 5 illustrates an application of an algorithm according to one embodiment of the invention.

FIG. 5 is a depiction of the application of an algorithm according to one embodiment of the invention. In one embodiments, the algorithm 500 may be the same algorithm 400 described with respect to FIG. 4. In one embodiment, a tape $T_x$ 510 and a drive $D_b$ 520 may be interacting with other objects before and after they intersect for their own experience 530. For instance, tape $T_x$ 510 may interact with a drive $D_a$ at experience 501 prior to interacting with drive $D_b$ at experience 530. Tape $T_x$ 510 may further interact with drive $D_c$ at experience 502 subsequent to interacting with drive $D_b$ at experience 530. Similarly, drive $D_b$ 520 may interact with tapes $T_v$ and $T_w$ at experiences 503 and 504, respectively, prior to interacting with tape $T_x$ at experience 530. Furthermore, drive $D_b$ 520 may interact with tapes $T_y$ and $T_z$ at experiences 505 and 506, respectively, subsequent to interacting with tape $T_x$ at experience 530.

At each experience 501-506, 530, the algorithm 500 described with respect to embodiments of the invention is applied to produce an updated quality and confidence metric for each of the tape and the drive involved in that experience. These tapes and drives then utilize these updated metrics for their next experiences. This is depicted in FIG. 5 by the metrics resulting from each experience being fed to the next experience as input.

For example, at experience 501, tape $T_x$ 510 provides as input its prior metrics including its tape quality metric ($T_{x,n-2}$) and its associated tape confidence metric ($C_{x,n-2}$). As illustrated, the x represents the particular object the metric refers to, while the n-2 represents the metrics relative position compared to experience 530 where tape $T_x$ 510 and drive $D_b$ 520 intersect. Furthermore, at experience 501, the drive's prior metrics of quality ($D_{a,n-1}$) and confidence ($C_{a,n-1}$) are provided as input. These two inputs along with the actual experience metric produced at the interaction are input into the algorithm of embodiments of the invention, and an updated metric is produced for both the drive ($D_{a,n}$; $C_{a,n}$) and tape ($T_{x,n-1}$; $C_{x,n-1}$).

In one embodiment, these updated metrics may then be stored as a history in each of the corresponding objects and further utilized as inputs in a subsequent experience. The metrics for each object are constantly being updated based on the experience with another object and the prior metrics for those objects. Accordingly, an asset management tool may utilize these metrics to analyze the history and predict the performance trend of the particular component for maintenance purposes.

To further assist in the understanding of embodiments of the invention, the following Table 1 provides an exemplary application of the algorithm described in embodiments of the invention:

TABLE 1

| | Algorithm Example | | | | |
|---|---|---|---|---|---|
| | Experience | Drive Quality | Drive Confidence | Tape Quality | Tape Confidence |
| Prior | | 0.93666 | 0.90159 | 0.21192 | 0.85001 |
| Current | 0.21051 | 0.93309 | 0.90146 | 0.21096 | 0.85003 |

The above Table 1 provides the inputs and outputs of an exemplary interaction of a tape and drive, and the resulting updated metrics from an application of the algorithm of embodiments of the invention. In one embodiment, Table 1 depicts the application of formulas 430, 435 described with respect to FIG. 4. For example, the current experience data and all of the prior metrics for the tape and drive would be inputs to formula 430. The current tape quality and confidence would be the outputs of formula 430. Similarly, the current experience data and all of the prior metrics for the tape and the drive would be inputs to formula 435. The current drive quality and confidence would be outputs of formula 435.

Referring to Table 1, the current experience (0.21051) is lower than the previous quality factor of the drive (0.93666), resulting in a decreased current quality factor of the drive (0.93309). In addition, the experience is lower than the previous quality factor of the tape (0.21192), resulting in a decreased current quality factor of the tape (0.21096). Furthermore, the tape contributed more to the negative experience because of its much lower quality factor as compared to the drive. This results in an increased confidence of the tape (0.85003) and a decreased confidence of the drive (0.90146).

Figure 6:
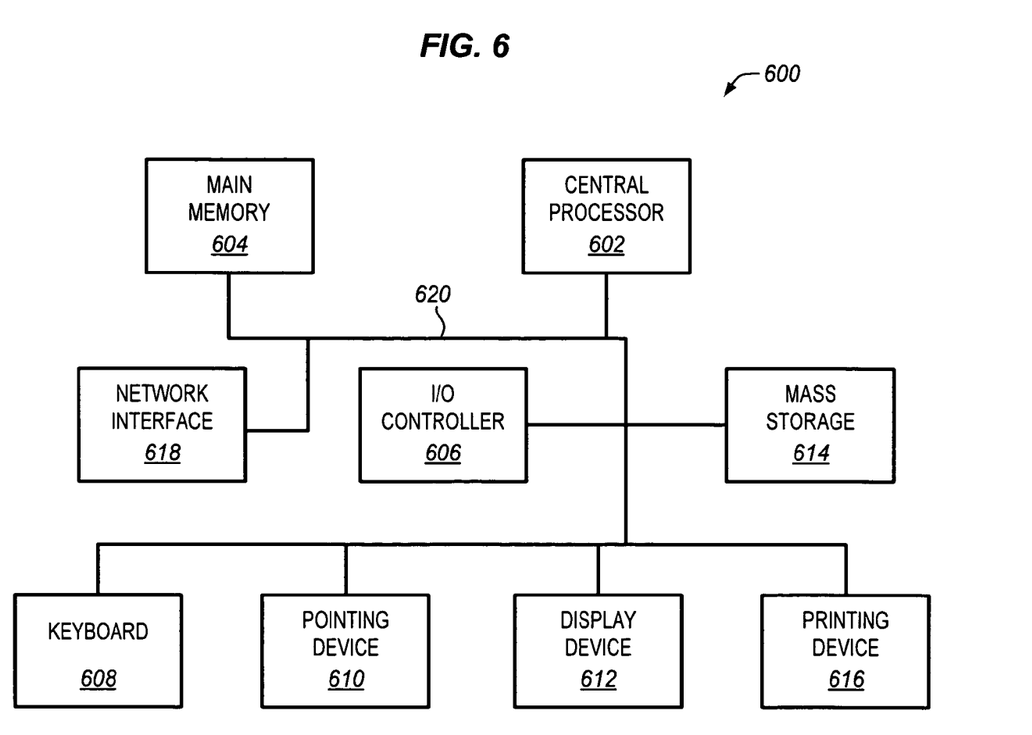
FIG. 6 is an illustration of an embodiment of a computer system.

FIG. 6 illustrates an exemplary computer system 600 in which certain embodiments of the present invention may be implemented. In one embodiment, the components of FIG. 1 or FIG. 2 may be implemented as system 600 or as components of system 600.

System 600 comprises a central processor 602, a main memory 604, an input/output (I/O) controller 606, a keyboard 608, a pointing device 610 (e.g., mouse, track ball, pen device, or the like), a display device 612, a mass storage 614 (e.g., a nonvolatile storage such as a hard disk, an optical drive, and the like), and a network interface 618. Additional input/output devices, such as a printing device 616, may be included in the system 600 as desired. As illustrated, the various components of the system 600 communicate through a system bus 620 or similar architecture.

In a further embodiment, system 600 may be a distributed computing system. In other words, one or more of the various components of the system 600 may be located in a physically separate location than the other components of the system 600. Such components may be accessed and connected via a network to the other components In accordance with an embodiment of the present invention, the computer system 600 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 602 may be a complex instruction set computer (CISC) microprocessor, a reduced instruction set computing (RISC) microprocessor, a very long instruction word (VLIW) microprocessor, a processor implementing a combination of instruction sets, and the like.

The network interface 618 provides communication capability with other computer systems on a same local network, on a different network connected via modems and the like to the present network, or to other computers across the Internet. In various embodiments of the present invention, the network interface 618 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 600 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 600 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
   generating an experience metric from an interaction between a media mounted in a drive;
   updating one or more metrics for each of the media and the drive based on the experience metric and one or more prior metrics of the media and the drive, wherein the one or more metrics are a quality metric of each of the media and the drive and a confidence metric of each of the media and the drive, further wherein one or more factors used to determine the quality metric and the confidence metric are adjusted by a weighting factor to compensate for a true quality of the media and the drive;

storing the one or more updated metrics to the associated media and drive; and utilizing the one or more updated metrics to predict performance trends of the media and the drive for preventative maintenance purposes.

2. A method comprising:

generating an experience metric from an interaction between a media mounted in a drive;

updating one or more metrics for each of the media and the drive based on the experience metric and one or more prior metrics of the media and the drive, wherein the one or more metrics are a quality metric of each of the media and the drive and a confidence metric of each of the media and the drive, further wherein the quality metric describes a predicted quality factor of each of the media and the drive given the experience metric and the one or more prior metrics each of the media and the drive, further wherein the confidence metric of the media describes a credibility of the quality factor of the media based on a quality and quantity of prior interactions with the drive, and the confidence metric of the drive describes a credibility of the quality factor of the drive based on a quality and quantity of prior interactions with the media;

storing the one or more updated metrics to the associated media and drive; and utilizing the one or more updated metrics to predict performance trends of the media and the drive for preventative maintenance purposes.

3. The method of claim 1, wherein the experience metric represents a quality of the interaction between the media and the drive.

4. The method of claim 1, wherein the one or more metrics measures at least one of a recording efficiency during the interaction, an expansion encountered during the interaction, a read efficiency during the interaction, and a write efficiency during the interaction.

5. The method of claim 1, wherein the one or more metrics are normalized to a value between zero and one.

6. A method comprising:

generating an experience metric from an interaction between a media mounted in a drive;

updating one or more metrics for each of the media and the drive based on the experience metric and one or more prior metrics of the media and the drive, wherein the one or more metrics are a quality metric of each of the media and the drive and a confidence metric of each of the media and the drive, further wherein the confidence metric:

indicates how much the quality metric changes during the interaction;

increases when the experience metric is as strong as the stronger of the quality metric of media or the drive;

adjusts based on its contribution to the experience metric;

increases as the quality metric reaches stability;

storing the one or more updated metrics to the associated media and drive; and utilizing the one or more updated metrics to predict performance trends of the media and the drive for preventative maintenance purposes.

7. An article of manufacture, comprising a machine-accessible medium including data that, when accessed by a machine, cause the machine to perform operations comprising:

generating an experience metric from an interaction between a media mounted in a drive;

updating one or more metrics for each of the media and the drive based on the experience metric and one or more prior metrics of the media and the drive, wherein the one or more metrics are a quality metric of each of the media and the drive and a confidence metric of each of the media and the drive, further wherein one or more factors used to determine the quality metric and the confidence metric are adjusted by a weighting factor to compensate for a true quality of the media and the drive;

storing the one or more updated metrics to the associated media and drive; and utilizing the one or more updated metrics to predict performance trends of the media and the drive for preventative maintenance purposes.

8. The article of manufacture of claim 7, wherein:

the quality metric describes a predicted quality factor of each of the media and the drive given the experience metric and the one or more prior metrics each of the media and the drive;

the confidence metric of the media describes a credibility of the quality factor of the media based on a quality and quantity of prior interactions with the drive; and the confidence metric of the drive describes a credibility of the quality factor of the drive based on a quality and quantity of prior interactions with the media.

9. The article of manufacture of claim 7, wherein the one or more metrics measures at least one of a recording efficiency during the interaction, an expansion encountered during the interaction, a read efficiency during the interaction, and a write efficiency during the interaction.

10. The article of manufacture of claim 7, wherein the confidence metric:

indicates how much the quality metric changes during the interaction;

increases when the experience metric is as strong as the stronger of the quality metric of media or the drive;

adjusts based on its contribution to the experience metric;

increases as the quality metric reaches stability.

11. An apparatus, comprising:

a recording media;

a drive to receive and interact with the recording media; and an asset management tool communicatively coupled to the recording media and the drive to analyze one or more performance trends of at least one of the recording media and the drive;

wherein the performance trends are based on one or more metrics of the recording media and the drive determined from an experience metric of an interaction between the recording media mounted in the drive and one or more prior quality and confidence metrics of the recording media and the drive, further wherein one or more factors used to determine the quality metric and the confidence metric are adjusted by a weighting factor to compensate for a true quality of the recording media and the drive.

12. The apparatus of claim 11, wherein:

the quality metric describes a predicted quality factor of each of the recording media and the drive given the experience metric and the one or more prior metrics each of the recording media and the drive;

the confidence metric of the recording media describes a credibility of the quality factor of the recording media based on a quality and quantity of prior interactions with the drive; and the confidence metric of the drive describes a credibility of the quality factor of the drive based on a quality and quantity of prior interactions with the recording media.

13. The apparatus of claim 11, wherein the one or more metrics measures at least one of a recording efficiency during the interaction, an expansion encountered during the interaction, a read efficiency during the interaction, and a write efficiency during the interaction.

14. The apparatus of claim 11, wherein the confidence metric:

indicates how much the quality metric changes during the interaction;

increases when the experience metric is as strong as the stronger of the quality metric of recording media or the drive;

adjusts based on its contribution to the experience metric;

increases as the quality metric reaches stability.

* * * * *